A. J. STOVER.
Wheel Cultivator.

No. 52,905.

Patented Feb. 27, 1866.

Witnesses:
Wm Trewin
Theo. Dusch.

Inventor:
A. J. Stover
By Munn & Co.
Atty.

UNITED STATES PATENT OFFICE.

ANDREW J. STOVER, OF SANDYVILLE, IOWA.

IMPROVEMENT IN CULTIVATORS.

Specification forming part of Letters Patent No. 52,905, dated February 27, 1866.

*To all whom it may concern:*

Be it known that I, ANDREW J. STOVER, of Sandyville, in the county of Warren and State of Iowa, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1:
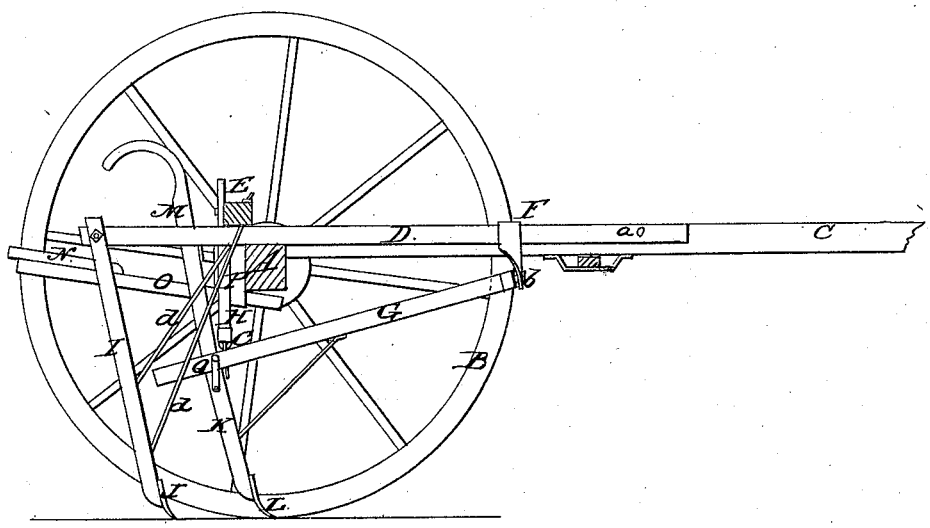
Figure 2:
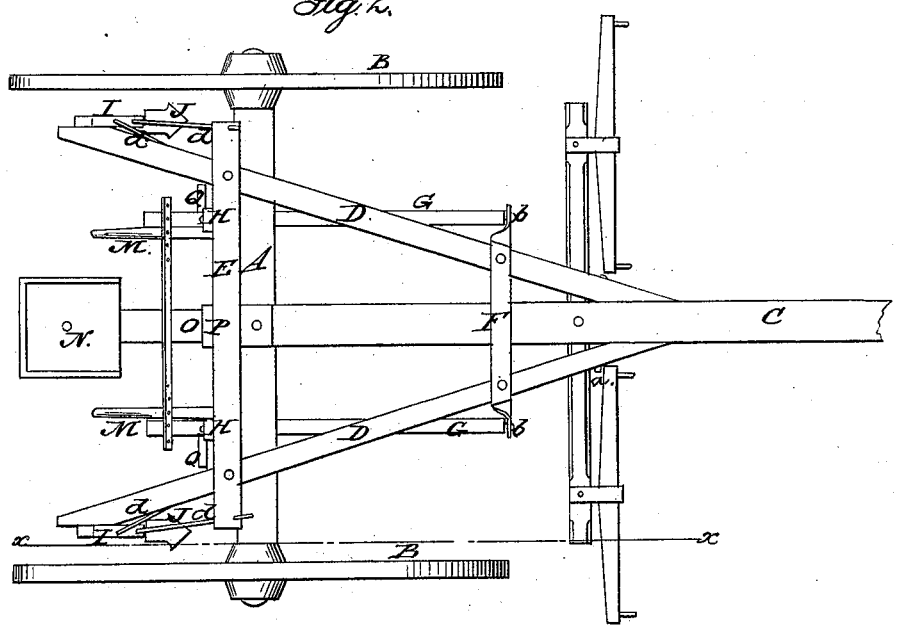

Figure 1 is a side sectional view of my invention, taken in the line $x$ $x$, Fig. 2; Fig. 2, a plan or top view of the same.

Similar letters of reference indicate corresponding parts.

This invention relates to a new and improved cultivator of that class in which laterally-adjustable plows are used; and the invention consists in a novel arrangement of the parts, as herein shown and described, whereby the operator has full control over the plows or shares, and the latter rendered capable of being operated while the driver is either walking or riding.

A represents an axle having a wheel, B, on each end of it, and a draft-pole, C, attached centrally to it at right angles. D D are two bars, which are placed one at each side of the draft-pole C, in an oblique position relatively therewith, and are fitted at their front ends on a bolt, $a$, which passes transversely through the draft-pole.

The bars D D are connected by a cross-bar, E, just above the axle A, and to said bars, near their front ends, there is attached transversely a metal bar, F, the ends of which extend down a suitable distance, and have the front ends of plow-beams G G attached to them by a swivel-connection, $b$, said beams being connected, near their rear ends, by eye-bolt-joints $c$, to the lower ends of pendants H H, attached to the cross-bar E of the oblique bars D D. To the rear end of each oblique bar D there is attached a standard, I, having a shovel-share, J, secured to its lower end, said standards being braced by rods $d$, and to the rear ends of the beams G G there are attached standards K, having shovel-shares L secured to their lower ends. Each beam G has a handle, M, attached to it, extending upward at the rear side of the axle A.

N is the driver's seat, which is attached to a bar, O, the latter passing through a metal loop, P, which is fitted on the rear end of the draft-pole.

The bar O may be shoved farther inward or outward, in order to place the seat N nearer to or farther from the axle, as occasion may require, in order that the machine may be kept in a properly-balanced state; and if the driver prefers to walk instead of ride, the bar O may be removed entirely from the machine.

Each beam G has a stirrup, Q, attached to it, by which the driver, when on the seat N, may turn the beams G, and thereby move the shares L laterally, in order that they may conform to the sinuosities of the rows of plants.

When the driver is walking behind the machine the shares L are moved through the medium of the handles M, and by raising the bars D all of the shares will be raised out of the ground.

From the above description it will be seen that the driver will have perfect control over the implement, and the team not subjected to any material amount of weight on their necks, as the device may be nicely balanced on its axle by adjusting the seat N.

Having thus described my invention, I claim as new and desire to secure by Letters Patent—

The oblique bars D D, connected to the draft-pole C, and having standards I and shares J attached, as shown, in combination with the plow-beams G G, connected to the bars D D, and arranged to admit of being turned to give a lateral movement to the shares L, substantially as and for the purpose set forth.

ANDREW J. STOVER.

Witnesses:
  WM. OLIVER,
  JAMES STAFFORD.